United States Patent [19]

Jackson

[11] 4,025,388
[45] May 24, 1977

[54] SHUTTING DOWN GAS COOLED NUCLEAR REACTORS

[75] Inventor: Fred Jackson, Annan, Scotland

[73] Assignee: British Nuclear Fuels Limited, Warrington, England

[22] Filed: Dec. 20, 1974

[21] Appl. No.: 534,786

[30] Foreign Application Priority Data

Dec. 27, 1973  United Kingdom ........... 59884/73

[52] U.S. Cl. ................ 176/86 R; 176/35; 176/36 R; 176/93 R
[51] Int. Cl.² ........................................ G21C 7/06
[58] Field of Search ........ 176/86 R, 35, 22, 91 SD, 176/93 R, 36 R

[56] References Cited

UNITED STATES PATENTS

| | | | |
|---|---|---|---|
| 2,937,127 | 5/1960 | Flora | 176/46 |
| 3,009,866 | 11/1961 | Fraas et al. | 176/49 |
| 3,050,454 | 8/1962 | Barr et al. | 176/46 |
| 3,158,547 | 11/1964 | Smith | 176/91 SP |
| 3,192,123 | 6/1965 | Costes | 176/86 R |
| 3,257,286 | 6/1966 | Ryon et al. | 176/22 |
| 3,346,458 | 10/1967 | Schmidt | 176/1 |
| 3,375,170 | 3/1968 | Stubley | 176/35 |
| 3,565,762 | 2/1971 | Nickel | 176/91 |
| 3,663,218 | 5/1972 | Yario | 176/93 BP |

FOREIGN PATENTS OR APPLICATIONS 1,932,915  8/1970  Germany ............ 176/86 R

OTHER PUBLICATIONS

Second U.N. Conference, 1958, vol. 11, pp. 187, 188.
NAA-SR-276 (Del.), Jan. 1954, p. 10.

*Primary Examiner*—Harvey E. Behrend
*Attorney, Agent, or Firm*—Larson, Taylor and Hinds

[57] ABSTRACT

The shutting down of a gas cooled nuclear reactor is effected by causing boron or other neutron poisons to deposit upon and adhere to reactor core surfaces. The introduction of the poison and other necessary substances into the core is achieved by spilling numerous coherent pellets into the core vessel; the pellets containing a substance which changes state at a predetermined temperature resulting in disintegration of the pellets and deposition of their constituents.

15 Claims, 5 Drawing Figures

U.S. Patent    May 24, 1977    4,025,388
FIG.1.    FIG.2.    FIG.3.
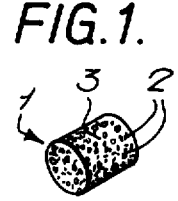
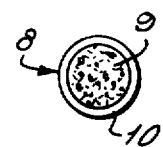
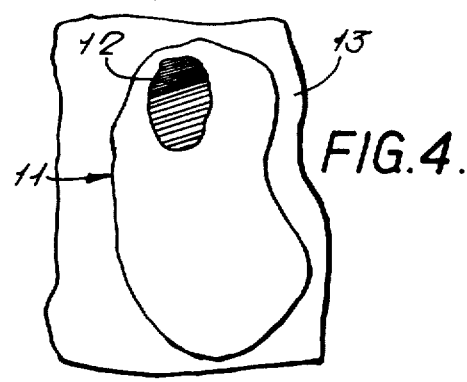
FIG.4.
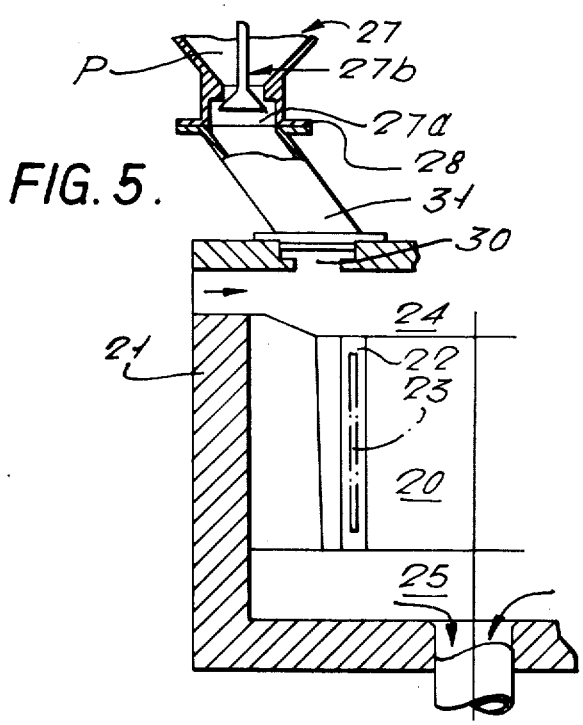
FIG.5.

SHUTTING DOWN GAS COOLED NUCLEAR REACTORS

BACKGROUND OF THE INVENTION

This invention relates to means for shutting down gas cooled nuclear reactors.

Emergency shutdown means for nuclear reactors are already known in which a supply of boron steel shot or boron powder is maintained adjacent a reactor site ready to be injected into the core when required. Both these alternative materials have their drawbacks. Firstly, in the case of boron steel shot, there is a limit to the proportion of boron which can be alloyed with steel and so for effective shutdown a large quantity of shot is required, and space in the reactor core to accommodate it is limited. Secondly with regard to boron powder, there is some uncertainty as to whether the powder once dispersed into the core will settle in the active part of the core in sufficient quantities to ensure shutdown. The present invention aims to provide a shutdown means which will be not subject to these drawbacks.

SUMMARY OF THE INVENTION

According to the invention there is provided material for injection into a gas cooled nuclear reactor core with the object of effecting reactor shutdown, the material comprising coherent pellets incorporating a neutron poison and a solid substance which changes state on rising to reactor core temperature causing disintegration of the pellet and resulting in deposition of the neutron poison in the core. The change of state may either be the melting of the solid substance or the evaporation of some component of the pellet which if encapsulated will burst due to the increase in internal pressure.

It is in fact preferred that the pellets be given a moisture resistant coating to prevent the pellets sticking together and to impart a free flowing characteristic to the pellets so that they can be rapidly spilled along the channels in the reactor leading to the core.

The neutron poison may be boron, cadmium, gadolinium or compounds of these elements. For the coating or encapsulation of pellets, a suitable polymer may be used such as a polyester or a polyamide. The pellets whether encapsulated, or not, need not be of uniform size or density. If desired, the density of the pellets may be increased, for easy flowing under gravity by incorporating a dense particulate material in the mix. Such a material may be steel filings, for example. By making the pellets in any given batch of different densities and sizes, a more widespread dispersal of poison can be effected. A further variable is the bursting strength of the coating on the encapsulated pellets.

The substance in the pellet which undergoes a change of state at a given temperature and effects disintegration of the pellet is carefully selected according to the operating temperature of the nuclear reactor in which the pellets are intended to be used. Considering firstly the substances which change state by melting, for reactors with core temperatures of about 180° C, paraffin wax, which melts at about 90°-100° C is suitable whilst for higher temperature cranko or PVC, would be suitable. For even higher temperatures calcium fluoride or lithium fluoride are suitable; their melting points being in the region of 800° C. When melting occurs, the liquid substance is deposited on the core surfaces and the poison adheres to the wetted surfaces. A suitable neutron poison constituent is boron carbide.

Pellets made with any of the above materials may if desired be coated or encapsulated with the aim of modifying the conditions under which the phase change occurs.

Alternatively, pellets may contain a substance, which changes state by rapid evaporation at a predetermined temperature and the developed internal pressure is high enough to burst the pellet and spatter the neutron poison over the reactor surfaces.

DESCRIPTION OF THE DRAWINGS

In order that the invention may be better understood reference is made to the description of the invention which follows to the accompanying diagramatic drawings of which FIGS. 1, 2 and 3 are illustrations of typical pellets FIG. 4 shows diagrammatically the behaviour of a single pellet made in accordance with the invention according to the method of Example III and FIG. 5 is a diagram showing how the pellets may be employed.

DESCRIPTION OF THE PREFERRED EMBODIMENTS

FIG. 1 shows a solid cylindrical pellet 1 about 0.2 inches both in dimater and in length and composed of a neutron poison 2 such as boron carbide and a solid substance 3 such as paraffin wax which will melt on being raised to the temperature of a nuclear reactor core. On melting, the wax substance 3 is deposited on an adjacent surface, carrying with it the neutron poison 2. FIG. 2 shows a roughly spherical pellet 4 whose size lies in the range ⅛–½ inch diameter and containing boron compound grains 5 and a solid substance 6 which changes state on being raised to reactor core temperature. The pellet 4 is coated with a polyvinyl chloride layer 7 to resist damage by atmospheric moisture and agglomeration with other pellets.

Generally the pellets contain the maximum loading of neutron poison relative to the binder or encapsulation material consistent with the pellets holding together as a coherent pellet. Either one or both of these constituents may play a part in causing disintegration deposition and adherence of the pellet to surfaces on which the deposition occurs.

FIG. 3 shows a roughly spherical pellet 8 whose interior 9 contains boron carbide as a neutron poison and a substance which becomes a gaseous phase on being raised to core temperature such as ammonium nitrate. The pellet is encapsulated with a layer composed of a polyamide plastic 10. On being raised to reactor core temperature the nitrate breaks down to gaseous products causing a pressure rise which bursts the coating so scattering the poison over the core surfaces.

Examples of the mode of preparation of these pellets will now be given:

EXAMPLE I

Equal parts by weight of boron carbide and boric acid ($H_3BO_3$) were mixed together and a solution of 35% plasticised PVC in cyclohexanone about 15% by weight of the mixture. Sufficient PVC was present to act as a binder. The resulting stiff paste was then granulated with a solvent removing substance in a current of warm air. The granules were then pressed into pellets and heated to 100° C to remove any residual solvents.

The pellets were then coated by dipping into a similar PVC solution and the excess solution allowed to drain off. The PVC solvent was removed in a current of warm air and the pellets are dipped to apply a second coating layer. Solvent removal was repeated following the earlier procedure. The pellets obtained were of a coherent but rubbery consistency having a fairly thick coating of PVC.

In a rough bench test performed on these pellets to simulate in-core reactor conditions they were held on a hot plate at 220° C inclined at 45° of 1 minute, the pellets adhered to the surface forming a tarry mass the boric acid and PVC acting as adhesive. Alternative polymer coatings may be applied to the pellets.

EXAMPLE II

A mixture of 40% boron carbide, 40% boric acid ($H_3BO_3$) and 20% paraffin wax, all by weight, was pressed in pellets spherical in shape and ½ inch diameter. The pellets were rough bench tested by dropping them onto an inclined hot plate at 240°C. The wax melted and deposited upon the plate along with the boron compounds. The result was a porous glassy mass which adhered to the plate.

EXAMPLE III

A three constituent mixture of equal parts of boron carbide, boric acid $H_3BO_3$ and paraffin wax was prepared and pressed into spherical pellets about ½ diameter. The pellets were coated in PVC by the method used in Example I. One of these pellets was applied to a surface which had been heated to 220°C. The result illustrated by FIG. 3 indicates that the pellet quickly adhered to the hot surface. Rapid melting of the wax 11 and fusion of the boric acid occurred, the boron constituent being fixed to the surface as a porous mass 12 by the melted materials. For the temperature conditions stated this method is presently preferred. The area covered on the surface 13 are correctly shown, the area of 11 being roughly 1 × 2 inches.

It will be understood that the materials used in the pellets must match the temperature conditions which they are to be encountered in the nuclear reactor. Nevertheless the possibility that the pellet may disintegrate before entering the reactor core may be guarded against by coating or encapsulation or by ensuring that any transit pipes into the reactor are below the critical disintegration temperature for the pellets.

The word encapsulation includes coating with polyester or polyamides; the binder for the inner pellet evaporating at a temperature lower than the melting point of the coating. In the following example polyamide is employed.

EXAMPLE IV

A high melting point wax was converted to granular form by the method already described in Example III. These granules were mixed with the following in the proportions (by weight)

30% — Wax
10% — Ammonium Nitrate
30% — Borax
30% — Boron Carbide

After mixing, the powder was pressed into pellets roughly spherical in shape and lying within the size range ⅛ to ½ inch diameter. The pellets were coherent enough to allow them to be dipped in a solution of nylon chips in cyclohexanone to receive a coating. Once removed the pellets were dried in air when polymerization occured.

The encapsulated pellets were stored for introduction into a nuclear reactor when required to effect reactor shutdown.

When introduced into core coolant channels at temperature of 800° C, the ammonium nitrate decomposed to form gaseous products which burst the layer scattering the neutron poisons, borax, boron carbide over the core surfces. The hot borax caused these deposits to adhere to the core surfaces which were thereby wetted. Although the above examples suggest that the pellets on any one batch are uniform shape size and density, advantage may be gained if these properties vary as between pellets of the same batch so that the settling velocity of the pellets varies and a wider distribution occurs within the core. In this respect it is possible to adjust the weight of the pellets by adding heavy metal filings to their constituents, eg steel filings. This will assist for example where the pellets are intended for injection against a coolant flow tending to oppose their entry into the core. The shape of the pellets is also a factor in arriving at a satisfactory settling velocity against an opposing gas flow. Variations in composition of the pellets may be made without departing from the inventive concept. For example, cranko type binder may replace paraffin wax or PVC; calcium fluoride or lithium fluoride may replace the borax as adhesive especially for very high temperatures found in High Temperature Reactors.

For the sake of completeness FIG. 5 is included to show one example of the mode of shutting down a gas cooled nuclear reactor employing pellets made for instance by the method described in Example III.

A gas cooled nuclear reactor comprises a graphite core structure 20 enclosed within a pressure vessel 21. The core structure 20 has vertical coolant channels 22 containing metal canned fuel elements 23 which are cooled by gas circulated from core gas plenum 24 through the channels 22. The coolant then passes into a hot gas plenum 25 at the base of the bore whence it is withdrawn for use in a hot gas utilisation plant and after cooling returned to the reactor.

A store of pellets P is maintained in a container 27 near the nuclear reactor, and having its gravity discharge orifice 27a closed by valve 27b. A closure seal plate 28 backs up the closure action of the valve. A penetration 29, valved if necessary, in the reactor vessel top cap is closed by a seal plug fitting recess 30 by bolts. A short length of flanged ducting 31 is kept ready for coupling the orifice 27a to the penetration 29 so that on operation of the valve 27b, pellets may be spilled into the reactor. Thus, when there is a failure of the other shutdown mechanism, and the use of pellets becomes essential, whilst the core reactivity is being held below criticality by the gradual delay of fission product poison xenon, a period of some time, the penetration 29 is opened up and the vessel interior connected with the discharge orifice 27a of the container 27. The valve 27b is opened letting the pellets pour into the cool gas plenum 24. From the plenum 24 many pellets enter the coolant channels 22, where the heat ensures a phase change of one or more pellet constituent and the deposition or scattering of the neutron poison over the fuel 23 and channel walls occurs. The deposits can form a porous adherent mass which will not altogether inhibit any natural or forced circulation of coolant.

I claim:

1. In a gas cooled nuclear reactor having a reactor core with coolant channels therethrough, a material, for introduction into said coolant channels to effect reactor shutdown, said material being normally contained at a region remote from said reactor core and comprising a plurality of coherent, free-flowing pellets each pellet comprising a solid neutron poison material and a solid organic substance, said organic substance remaining solid at a first, relatively low, temperature prevailing in said coolant channel at said region remote from the reactor core to allow free flow of the pellets through the coolant channel, said organic substance melting at a second, relatively high, temperature prevailing in said coolant channel at a region within the reactor core, the molten organic substance being adherent to a coolant channel wall and to the solid neutron poison material and thus capable of adhering the solid neutron poison substance to a coolant channel wall in the reactor core.

2. A material according to claim 1 wherein said neutron poison comprises boron, cadmium or gadolinium.

3. A material according to claim 2 wherein said solid organic substance comprises wax.

4. A material according to claim 2 wherein said solid organic substance comprises a polymer.

5. A material according to claim 1 wherein said pellets comprise a waterproof outer coating.

6. A material according to claim 3 wherein said neutron poison comprises boron carbide.

7. A method of shutting down a gas cooled nuclear reactor which method comprises introducing into a coolant channel which extends into the reactor core of a nuclear reactor and coolant channel which has a first, relatively low, temperature at a region remote from said nuclear reactor and a second, relatively high, temperature at the core region of said nuclear reactor, a plurality of coherent, free flowing pellets, said pellets being introduced into said coolant channel at said remote region and flowing freely therethrough to said core region, said pellets each comprising a neutron poison substance and a solid substance which changes in state on rising to a pre-determined temperature prevailing in said core region of said coolant channel, said change in state resulting in disintegration of said pellet and deposition of said neutron poison in said core region of said coolant channel to effect shut-down of the reactor.

8. A method according to claim 7 wherein said solid substance is one which melts at the higher temperature prevailing in the core region of said coolant channel and which, in its molten state, is adherent to a wall of the coolant channel in said core region.

9. A method according to claim 7 wherein said solid substance comprises a wax or a polymer.

10. A method according to claim 7 wherein said pellet is provided with an outer protective coating.

11. A method according to claim 10 wherein said solid substance and said neutron poison are encapsulated within said outer protective coating and wherein said solid substance comprises a material which changes to the gaseous state on rising to said pre-determined temperature, said material being present in an amount sufficient such that, upon reaching said pre-determined temperature, the gas thus formed bursts said pellets to scatter the neutron poison in said reactor core region of the coolant channel.

12. A method according to claim 11 in which said material comprises ammonium nitrate.

13. A method according to claim 7 wherein said solid substance is selected from the group consisting of boric acid, calcium fluoride and lithium fluoride.

14. A method according to claim 7 wherein said pellets move through said coolant channel by the force of gravity.

15. A method according to claim 14 wherein said pellets include a heavy, weight adjusting substance to facilitate gravitational movement of the pellets.

* * * * *